US008747703B2

(12) United States Patent
Sasaki et al.

(10) Patent No.: US 8,747,703 B2
(45) Date of Patent: Jun. 10, 2014

(54) ELECTRICALLY CONDUCTING CURABLE RESIN COMPOSITION, CURED PRODUCT THEREOF AND METHOD FOR PRODUCING THE SAME

(75) Inventors: Nobutoshi Sasaki, Kawasaki (JP); Masayuki Noguchi, Kawasaki (JP); Kentaro Seki, Aizuwakamatsu (JP)

(73) Assignee: Showa Denko K.K., Tokyo (JP)

(*) Notice: Subject to any disclaimer, the term of this patent is extended or adjusted under 35 U.S.C. 154(b) by 377 days.

(21) Appl. No.: 13/079,711

(22) Filed: Apr. 4, 2011

(65) Prior Publication Data

US 2011/0180762 A1 Jul. 28, 2011

Related U.S. Application Data

(62) Division of application No. 11/887,142, filed as application No. PCT/JP2006/306047 on Mar. 20, 2006.

(60) Provisional application No. 60/671,076, filed on Apr. 14, 2005.

(30) Foreign Application Priority Data

Apr. 4, 2005 (JP) ................................. 2005-107554

(51) Int. Cl.
*H01B 1/24* (2006.01)
*B82Y 30/00* (2011.01)

(52) U.S. Cl.
USPC ............ 252/511; 252/510; 252/500; 977/742

(58) Field of Classification Search
USPC .......................................... 252/500, 510, 511
See application file for complete search history.

(56) References Cited

U.S. PATENT DOCUMENTS

| 3,741,931 A | 6/1973 | Martin et al. |
| 6,410,666 B1 * | 6/2002 | Grubbs et al. ................. 526/171 |
| 2003/0191228 A1 | 10/2003 | Noguchi et al. |

FOREIGN PATENT DOCUMENTS

| EP | 1 085 046 A2 | 3/2001 |
| EP | 1 414 894 A | 5/2004 |
| JP | 1-297443 A | 11/1989 |
| JP | 2002-3648 A | 1/2002 |
| JP | 2003-176327 A | 6/2003 |
| JP | 2003-192914 A | 7/2003 |
| JP | 2005-285537 A | 10/2005 |
| KR | 2003-36887 A | 5/2003 |
| TW | 591068 B | 6/2004 |
| WO | 03/014209 A1 | 2/2003 |
| WO | 2004/059766 A1 | 7/2004 |
| WO | 2005/086177 A1 | 9/2005 |

OTHER PUBLICATIONS

K.P. Sau, et al.; "Conductive rubber composites from different blends of ethylene-propylene-diene rubber and nitrile rubber"; Journal of Materials Science; vol. 32, No. 21; Nov. 1, 1997; pp. 5717-5724; XP-000704817.

* cited by examiner

*Primary Examiner* — Harold Pyon
*Assistant Examiner* — Katie L Hammer
(74) *Attorney, Agent, or Firm* — Sughrue Mion, PLLC

(57) ABSTRACT

There is provided a curable composition which can give a cured product having excellent physical properties and is particularly useful as a material for the separator of a fuel cell such as polymer electrolyte fuel cell. The electrically conducting curable resin composition of the present invention comprises (A) a hydrocarbon compound having a plurality of carbon-carbon double bonds, (B) an elastomer excluding the component (A), and (C) a carbonaceous material.

17 Claims, 2 Drawing Sheets

FRONT SURFACE

BACK SURFACE

ELECTRICALLY CONDUCTING CURABLE RESIN COMPOSITION, CURED PRODUCT THEREOF AND METHOD FOR PRODUCING THE SAME

CROSS-REFERENCES TO RELATED APPLICATIONS

This application is a Rule 53(b) Divisional of U.S. application Ser. No. 11/887,142 filed Sep. 26, 2007, which is a 371 of PCT Application No. PCT/JP2006/306047 filed Mar. 20, 2006, which claims benefit to Provisional Application No. 60/671,076 filed Apr. 14, 2005 and Japanese Patent Application No. 2005-107554 filed Apr. 4, 2005. The above-noted applications are incorporated herein by reference in their entirety.

TECHNICAL FIELD

The present invention relates to a curable resin composition. More specifically, the present invention relates to a curable resin composition excellent in the electrical conductivity, mechanical strength and moldability, a cured product thereof, and a molded article of the composition or cured product.

BACKGROUND ART

Conventionally, a material such as metal and carbon material has been used in usage where high electrical conductivity is required. Particularly, a carbon material has played an important role in the field of electronics, electrochemistry, energy, transport devices and the like, because this material is excellent in the electrical conductivity, is free from corrosion unlike a metal, and moreover exhibits excellent properties such as heat resistance, lubricity, thermal conductivity and durability. The carbon material has achieved remarkable development also as a composite material comprising a combination of a carbon material and a polymer material, and as a result, such a composite material has played a role of realizing high performance and high functionality. By virtue of the combination with a polymer material, the latitude in mold-processing is expanded and this is one of the reasons why the carbon material has been developed in each field where the electrical conductivity is required.

On the other hand, in view of environmental issue and energy problem, a fuel cell is recently attracting an attention. The fuel cell is a clean power generator of generating electricity by a reverse reaction of electrolysis using hydrogen and oxygen and causing no waste except for water. Also in this fuel cell field, a carbon material and a polymer material can play a large role. The fuel cell is classified into several types according to the kind of the electrolyte but among these, a polymer electrolyte fuel cell can work at a low temperature and therefore, is promising as a power generator for automobile or consumer use. In such a fuel cell, unit cells each comprising, for example, a polymer electrolyte, a gas diffusing electrode, a catalyst and a separator are stacked, whereby high output power generation can be achieved.

In the separator for dividing a unit cell of the fuel cell, flow channels (grooves) for supplying a fuel gas (e.g., hydrogen) and an oxidizing agent gas (e.g., oxygen) and discharging free water (water vapor) generated are generally formed. Therefore, the separator is required to have high gas impermeability capable of completely separating these gases and high electrical conductivity for reducing the internal resistance and furthermore, be excellent in the strength, thermal conductivity, durability and the like.

For the purpose of satisfying these requirements, studies on the fuel cell separator have been heretofore made from both aspects of a metal material and a carbon material. As for the metal material, a noble metal or carbon is coated on the surface with an attempt to solve the problem of corrosion, but sufficiently high durability cannot be obtained and the cost for coating becomes a problem.

On the other hand, many studies have been also made on the carbon material for a fuel cell separator and examples of the separator material for a fuel cell include a molded article obtained by press-molding an expanded graphite sheet, a molded article obtained by impregnating a carbon sintered body with a resin and curing it, a vitrified carbon obtained by firing a thermosetting resin, and a molded article obtained by mixing a carbon powder and a resin and then molding the mixture.

For example, JP-A-8-222241 (the term "JP-A" as used herein means an "unexamined published Japanese patent application") (Patent Document 1) discloses a complicated process of adding a binding material to a carbonaceous powder, mixing these under heating, subjecting the mixture to CIP molding (cold isostatic pressing) and graphitization by firing, impregnating the obtained isotropic graphite with a thermosetting resin, applying a curing treatment thereto, and grooving the cured product by cutting work.

Also, JP-A-60-161144 (Patent Document 2) discloses a technique of impregnating a carbon powder- or carbon fiber-containing paper sheet with a thermosetting resin, stacking and press-bonding the paper sheets, and firing the stacked body, and JP-A-2001-68128 (Patent Document 3) discloses a technique of injection-molding a phenol resin in a mold having a shape of the separator and firing the molded article.

The material subjected to a firing treatment as in these examples exhibits high electrical conductivity and high heat resistance but has a problem that the time period required for the firing is long to give rise to poor productivity and also, the flexural strength is low. Furthermore, in the case where cutting work is required, the cost becomes high due to more difficulty of mass production and the prospect as a material to be widespread in the future is very severe.

Studies are being made on a mold-forming method as the means expected to yield high mass productivity and low cost, and the material applicable thereto is generally a composite of a carbonaceous material and a resin. For example, a separator comprising a thermosetting resin (e.g., phenol resin), graphite and carbon is disclosed in JP-A-58-53167 (Patent Document 4), JP-A-60-37670 (Patent Document 5), JP-A-60-246568 (Patent Document 6), JP-B-64-340 (the term "JP-B" as used herein means an "examined Japanese patent publication") (Patent Document 7) and JP-B-6-22136 (Patent Document 8); a bipolar separator comprising a thermosetting resin (e.g., epoxy resin) and an electrically conducting substance (e.g., graphite) is disclosed in JP-B-57-42157 (Patent Document 9); and a separator comprising a thermosetting resin (e.g., phenol resin, furan resin) having blended therein expanded graphite and carbon black is disclosed in JP-A-1-311570 (Patent Document 10).

In the case of a separator using a composite of a carbon-based filler and a resin, the filling amount of a carbon-based filler needs to be greatly increased for expressing high electrical conductivity but since the resin content is increased so as to maintain the mold-formability, it has been difficult to obtain sufficiently high electrical conductivity.

Furthermore, when the process includes a firing step of heating the molded article at a high temperature of 1,000 to 3,000° C. for obtaining high electrical conductivity, this causes a problem that not only the production takes a long time but also the production process becomes complicated and the cost arises.

The fuel cell separator is also required to have hot water resistance as well as heat resistance. However, the above-described conventional cured product comprising a thermosetting resin and a carbon material fails in having a satisfactory performance with respect to high hot water resistance required in usage as a fuel cell separator. More specifically, the thermosetting resin having an ester or urethane bond in its structure sometimes undergoes hydrolysis due to hot water generated from the fuel cell and therefore, in usage where the operating time is estimated to last long, such as automobile and home appliance, a product having sufficiently high durability cannot be obtained by using a conventional cured product comprising a thermosetting resin and a carbon material.

A separator disclosed in JP-A-2004-250661 (Patent Document 11) is considered to satisfy the performances required of the separator in practical use, such as heat resistance, hot water resistance, durability and mechanical strength, but since unit cells are stacked in the fuel cell and an electric current flows through the separator fundamentally in the penetration direction, if the resistance in the penetration direction is high, the voltage loss and in turn the heating value are, increased and for obtaining a desired high output, an increased number of cells stacked or a large load for the dissipation of heat in an excess heating value is involved. Also from these aspects, higher electrical conductivity is demanded.

[Patent Document 1] JP-A-08-222241
[Patent Document 2] JP-A-60-161144
[Patent Document 3] JP-A-2001-068128
[Patent Document 4] JP-A-58-053167
[Patent Document 5] JP-A-60-037670
[Patent Document 6] JP-A-60-246568
[Patent Document 7] JP-B-64-000340
[Patent Document 8] JP-B-06-022136
[Patent Document 9] JP-B-57-042157
[Patent Document 10] JP-A-01-311570
[Patent Document 11] JP-A-2004-250661

SUMMARY OF THE INVENTION

The present invention has been made under these circumstances and an object of the present invention is to provide an electrically conducting curable resin composition capable of giving a cured product assured of high fillability of an electrically conducting filler, excellent formability in molding (e.g., compression molding, transfer molding, injection molding, injection-compression molding) and high electrical conductivity. Another object of the present invention is to provide a fuel cell separator, a current collector or electrode for battery, which are obtained by mold-forming the above-described composition and exhibit excellent electrical conductivity, and production methods thereof.

As a result of intensive investigations to attain the above-described objects, the present inventors have found that when a hydrocarbon compound having a plurality of carbon-carbon double bonds and an elastomer excluding a hydrocarbon compound having a plurality of carbon-carbon double bonds are combined with a carbonaceous material, not only a curable resin composition having excellent mold-formability is obtained but also the cured product thereof is assured of excellent electrical conductivity.

That is, the present invention relates to the following matters [1] to [23].

[1] An electrically conducting curable resin composition comprising (A) a hydrocarbon compound having a plurality of carbon-carbon double bonds, (B) an elastomer excluding the component (A), and (C) a carbonaceous material.

[2] The electrically conducting curable resin composition as described in [1] above, wherein the hydrocarbon compound (A) having a plurality of carbon-carbon double bonds is a polymer having carbon-carbon double bonds in the side chain.

[3] The electrically conducting curable resin composition as described in [2] above, wherein the polymer having carbon-carbon double bonds in the side chain is a polymer having carbon-carbon double bonds in the side chain and containing 60 mol % or more of a saturated monomer unit in the main chain.

[4] The electrically conducting curable resin composition as described in [3] above, wherein the polymer having carbon-carbon double bonds in the side chain and containing 60 mol % or more of a saturated monomer unit in the main chain is obtained by polymerizing a diene compound as the main monomer.

[5] The electrically conducting curable resin composition as described in [4] above, wherein the diene compound is at least one member selected from butadiene, pentadiene and isoprene.

[6] The electrically conducting curable resin composition as described in [1] above, wherein the hydrocarbon compound (A) having a plurality of carbon-carbon double bonds is at least one member selected from 1,2-polybutadiene, 3,4-polyisoprene and a styrene-isoprene copolymer.

[7] The electrically conducting curable resin composition as described in [1] above, wherein the hydrocarbon compound (A) having a plurality of carbon-carbon double bonds is a polymer comprising 60 mol % or more of a monomer unit represented by the following formula (1) or (2):

[8] The electrically conducting curable resin composition as described in any one of [1] to [7] above, wherein the elastomer (B) is one member selected from the group consisting of a hydrogenated acrylonitrile butadiene rubber, an ethylene octene copolymer, an ethylene butene copolymer, an ethylene propylene rubber, a fluororubber, an isoprene rubber, a silicone rubber, an acryl rubber, a norbornene rubber and a butyl rubber, or a combination of two or more members selected therefrom.

[9] The electrically conducting curable resin composition as described in any one of [1] to [8] above, wherein the elastomer (B) is one member selected from the group consisting of a hydrogenated acrylonitrile butadiene rubber, an ethylene octene copolymer, an ethylene butene copolymer, an ethylene propylene rubber, an isoprene rubber, an acryl rubber, a norbornene rubber and a butyl rubber, or a combination of two or more members selected therefrom.

[10] The electrically conducting curable resin composition as described in [1] to [9] above, wherein the carbonaceous material (C) is one member selected from natural graphite, artificial graphite, expanded graphite, carbon black, carbon fiber, vapor grown carbon fiber with a fiber diameter of 0.05 to 10 μm and a fiber length of 1 to 500 μm, and carbon nanotube with a fiber diameter of 0.5 to 100 nm and a fiber length of 0.01 to 10 or a combination of two or more members selected therefrom.

[11] The electrically conducting curable resin composition as described in any one of [1] to [10] above, wherein the carbonaceous material (C) has a powder specific electrical resistance of 0.1 Ωcm or less in the direction at right angles to the applied pressure direction in the state of being pressurized to have a bulk density of 1 g/cm$^3$.

[12] The electrically conducting curable resin composition as described in any one of [1] to [11] above, wherein the carbonaceous material (C) comprises from 0.05 to 10% by weight of boron.

[13] The electrically conducting curable resin composition as described in any one of [1] to [12] above, wherein the mass ratio between the hydrocarbon compound having a plurality of carbon-carbon double bonds as the component (A) and the elastomer as the component (B) is from 20 to 98% by weight: from 80 to 2% by weight and assuming that the sum of the component (A) and the component (B) is 100 parts by weight, the carbonaceous material as the component (C) is contained at a proportion of 40 to 1,900 parts by weight per the sum of 100 parts by weight.

[14] The electrically conducting curable resin composition as described in any one of [1] to [13] above, which further comprises (D) a reactive monomer.

[15] An electrically conducting cured product obtained by curing the electrically conducting curable resin composition described in any one of [1] to [14] above.

[16] An electrically conducting cured product obtained by forming the electrically conducting curable resin composition described in any one of [1] to [14] above by any one method of compression molding, transfer molding, injection molding and injection-compression molding.

[17] The electrically conducting cured product as described in [15] or [16] above, wherein the volume resistivity according to JIS K7194 is 2×10$^{-2}$ Ωcm or less.

[18] The electrically conducting cured product as described in any one of [15] to [17] above, wherein the flexural strength according to JIS K6911 is 30 MPa or more.

[19] A method for producing an electrically conducting cured product, comprising forming the electrically conducting curable composition described in any one of [1] to [14] above by any one method of compression molding, transfer molding, injection molding and injection-compression molding.

[20] An electrically conducting molded article comprising the electrically conducting curable resin composition described in any one of [1] to [14] above or the electrically conducting cured product described in any one of [15] to [18] above.

[21] A fuel cell separator or a current corrector or electrode for battery, in which a flow channel for flowing a gas is formed on both surfaces or one surface, comprising the electrically conducting curable resin composition described in any one of [1] to [14] above or the electrically conducting cured product described in any one of [15] to [18] above.

[22] A method for producing a fuel cell separator or a current collector or electrode for battery, in which a flow channel for flowing a gas is formed on both surfaces or one surface, the method comprising forming the electrically conducting curable resin described in any one of [1] to [14] above by any one method of compression molding, transfer molding, injection molding and injection-compression molding.

[23] A fuel cell separator in which a flow channel for flowing a gas is formed on both surfaces or one surface and which is obtained from the electrically conducting curable resin composition described in any one of [1] to [14] above or the electrically conducting cured product described in any one of [15] to [18] above, wherein the volume resistivity according to JIS K7194 is 2×10$^{-2}$ Ωcm or less, the resistivity in the penetration direction is 2×10$^{-2}$ Ωcm or less and the flexural strength according to JIS K6911 is 30 MPa or more.

DETAILED DESCRIPTION OF THE INVENTION

Figure 1:
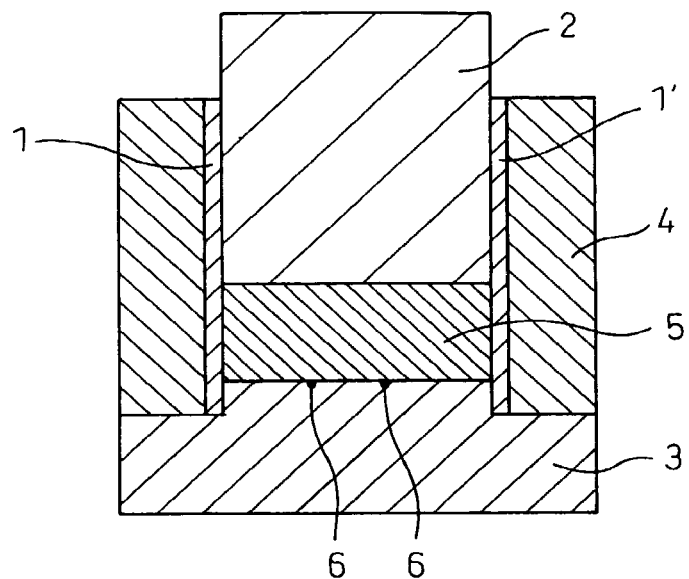
FIG. 1 illustrates a schematic cross-sectional view showing the method for measuring the specific electrical resistance of a carbonaceous material powder. Legends are as follows:
1: Electrode comprising copper plate
2: Compression rod comprising resin
3: Cradle (made of resin)
4: Side frame (made of resin)
5: Sample (carbonaceous material powder)
6: Voltage measuring terminal.

The present invention is described in detail below by referring to the drawings, if desired. In the following, unless otherwise indicated, the "parts" and "%" showing a quantitative ratio are on the weight basis.

Electrically Conducting Curable Resin Composition

The electrically conducting curable resin composition of the present invention comprises at least (A) a hydrocarbon compound having a plurality of carbon-carbon double bonds, (B) an elastomer excluding the component (A), and (C) a carbonaceous material.

Hydrocarbon Compound Having a Plurality of Carbon-Carbon Double Bonds

The hydrocarbon compound having a plurality of carbon-carbon double bonds as the component (A) for use in the present invention is a compound comprising carbon and hydrogen as the basic constituent elements but may contain an oxygen atom and a nitrogen atom. However, in order to avoid the hydrolysis due to hot water, a structure having an ester linkage, a urethane linkage or an amide linkage is preferably contained as little as possible in the compound. In the case where the compound is a polymer, the number of linkage such as ester linkage is preferably within 5% of the total number of monomer units.

This compound is preferably a polymer having carbon-carbon double bonds in the side chain. The polymer may be a homopolymer or a copolymer. Even in the case of a homopolymer, that is, a polymer comprising one kind of a monomer, the microstructure thereof sometimes varies depending on the polymerization method (conditions such as catalyst, temperature). For example, in the case of a butadiene homopolymer, when the monomer unit is mainly a 1,4-cis bond or a 1,4-trans bond, the polymer has a carbon-carbon double bond in the main chain and provides a rubber state at an ordinary temperature. Such a polymer is generally called a polybutadiene rubber. On the other hand, a polymer mainly comprising a monomer unit in which carbons at the 1-position and 2-position are forming the main chain (1,2-bond), provides the state of so-called resin when the molecular weight is increased, and becomes a viscous liquid when the molecular weight is low (polymerization degree is low).

In the case of the above-described diene compound, the monomer unit having a carbon-carbon double bond in the side chain and having a saturated main chain means preferably a 1,2-bond. The term "number of all monomer units" as used herein means, for example, in the case of polybutadiene, a sum total of monomer units by counting each of the 1,2-bond, 1,4-cis bond and 1,4-trans bond as one monomer unit. When other monomers are copolymerized, these monomers each is counted as one monomer unit. The monomer unit indicates individual moieties in the polymer, corresponding to respective monomers as the raw materials.

In the present invention, the monomer unit having a carbon-carbon double bond in the side chain and having a saturated main chain is preferably present at a proportion of 60 mol % or more, more preferably 70 mol % or more, still more preferably 85 mol % or more, based on the number of all monomer units constituting the polymer. If this quantitative ratio is less than 60 mol %, when the composition is cured by allowing reaction of the carbon-carbon double bond in the side chain, insufficient curing may result. Also, the flexural modulus, flexural strength and Tg (glass transition temperature) of the cured product containing a carbonaceous material tend to decrease.

The monomer unit having a carbon-carbon double bond in the side chain and having a saturated main chain is preferably a monomer unit represented by the following formula (1) or (2):

(1)

(2)

Diene Polymer

The polymer comprising 60 mol % or more of a monomer unit having a carbon-carbon double bond in the side chain and having a saturated main chain is preferably a polymer comprising the above-described diene compound (e.g., butadiene, pentadiene, isoprene) as the main monomer (a monomer occupying 50 mol % or more in raw material monomers) (in the present invention, such a polymer comprising, a diene compound as the monomer is sometimes referred to as a "diene polymer"). This diene polymer may be a copolymer comprising a plurality of diene compound monomers. Also, a part of the carbon-carbon bond in the side chain may be hydrogenated (the carbon-carbon bond becomes a saturated carbon-carbon bond by the hydrogenation).

Specific examples of the diene polymer usable in the present invention include, but are not limited to, 1,2-polybutadiene, 3,4-polypentadiene, 3,4-polyisoprene and polycyclopentadiene. In the present invention, the diene polymer is preferably 1,2-polybutadiene or 3,4-polyisoprene, more preferably 1,2-polybutadiene. These polymers may contain, as a microstructure, a monomer unit corresponding to the 3,4-bond of polybutadiene. Furthermore, a monomer other than the diene compound may be copolymerized. Examples of the monomer other than the diene compound include styrene, norbornadiene, maleic anhydride and methacrylic acid. The monomer unit of 3,4-bond and the monomer unit by other monomer each preferably occupies less than 40 mol %, more preferably less than 30 mol %, still more preferably less than 15 mol %, in the number of all monomer units.

The diene polymer is characterized by a low surface tension. The surface tension is a parameter showing the hydrophobicity or hydrophilicity on the surface of a substance. The polymer as the component (A) for use in the present invention is preferably hydrophobic. If the hydrophilicity becomes high, the affinity for water increases, as a result, the hot water resistance tends to decrease. Therefore, excess hydrophilicity is not preferred.

The synthesis method of such a diene polymer is not particularly limited. Specific examples of the synthesis method include, but are not limited to, those described in "Jikken Rei 2•20, Cobalt Shokubai niyoru 1,2-Polybutadiene to cis-1,4-Polybutadiene no Gosei (Experiment Example 2•20, Synthesis of 1,2-Polybutadiene and cis-1,4-Polybutadiene by Cobalt Catalyst)" of *Dai 4 Han, Jikken Kagaku Koza, Kobunshi Gosei (The Fourth Series of Experimental Chemistry, Synthesis of Polymer)*, 4th ed., page 41, compiled by The Chemical Society of Japan, issued by Maruzen (May 6, 1992); and "Jikken Rei 2•26, (Pr—O)$_4$Ti-Yuki Aluminum Kei Shokubai niyoru 3,4-Polyisoprene no Gosei (Experiment Example 2•26, Synthesis of 3,4-Polyisoprene by (Pr—O)$_4$Ti-Organoaluminum-Based Catalyst)" of *Dai 4 Han, Jikken Kagaku Koza, Kobunshi Gosei (The Fourth Series of Experimental Chemistry, Synthesis of Polymer)*, 4th ed., page 48, compiled by The Chemical Society of Japan, issued by Maruzen (May 6, 1992).

The method for confirming the microstructure of the synthesized diene polymer is not particularly limited and any method may be used. For example, the microstructure may be confirmed by a nuclear magnetic resonance method (hereinafter simply referred to as an "NMR method") or a Fourier transform infrared spectroscopy (hereinafter simply referred to as an "FT-IR" method). Specific examples thereof are described in "Jikken Rei 223, Sekigai Spectrum niyoru Polybutadiene no Micro-kozo no Sokutei (Experiment Example 223, Measurement of Microstructure of Polybutadiene by Infrared Spectrum)" of *Kobunshi Gosei no Jikken Ho (Experimental Technique for Polymer Synthesis)*, 8th copy, page 45, Kagaku Dojin (Mar. 1, 1984); "Jikken Rei 225, NMR niyoru Polybutadiene no Micro-kozo no Sokutei (Experiment Example 225, Measurement of Microstructure of Polybutadiene by NMR)" of *Kobunshi Gosei no Jikken Ho (Experimental Technique for Polymer Synthesis)*, 8th copy, page 49, Kagaku Dojin (Mar. 1, 1984); and "Jikken Rei 226, NMR niyoru Polyisoprene no Micro-kozo no Sokutei (Experiment Example 226, Measurement of Microstructure of Polyisoprene by NMR)" of *Kobunshi Gosei no Jikken Ho (Experimental Technique for Polymer Synthesis)*, 8th copy, page 45, Kagaku Dojin (Mar. 1, 1984). In the present invention, the microstructure is measured by the NMR method.

The diene polymer for use in the present invention is not particularly limited in its branched structure and terminal structure, and those after various modifications may also be used. Specific examples thereof include, but are not limited to, diene polymers having various structures such as acryl-modified, methacryl-modified, carboxyl-modified, maleic anhydride-modified or epoxy-modified structure.

Elastomer

The elastomer as the component (B) for use in the present invention is not particularly limited as long as it is a polymer compound exhibiting rubber elasticity excluding the component (A), but an appropriate elastomer is selected by taking account of mechanical strength, electrical conductivity, durability, heat resistance, hot water resistance, processability, compatibility with the hydrocarbon compound having a plurality of carbon-carbon double bonds, dispersibility in the composition, and high fillability of an electrically conducting filler. In particular, from the aspect of hot water resistance, an elastomer having a bond site prone to hydrolysis, such as ester bond and urethane bond, is preferably used in a small amount so as to avoid hydrolysis due to hot water but may be used in an appropriate amount in view of balance with other physical properties. Specifically, the elastomer is preferably one member selected from the group consisting of a hydrogenated acrylonitrile butadiene rubber, an ethylene octene copolymer, an ethylene butene copolymer, an ethylene propylene rubber, a fluororubber, an isoprene rubber, a silicone rubber, an acryl rubber, a norbornene rubber and a butyl rubber, or a combination of two or more members selected therefrom, more preferably one member selected from the group consisting of a hydrogenated acrylonitrile butadiene rubber, an ethylene octene copolymer, an ethylene butene copolymer, an ethylene propylene rubber, an isoprene rubber, an acryl rubber, a norbornene rubber and a butyl rubber, or a combination of two or more members selected therefrom, but the present invention is not limited thereto.

Carbonaceous Material

The carbonaceous material as the component (C) for use in the present invention is one member selected from natural graphite, artificial graphite, expanded graphite, carbon black, carbon fiber, vapor grown carbon fiber and carbon nanotube, or a combination of two or more members selected therefrom.

The carbonaceous material as the component (C) for use in the present invention preferably has a powder specific electrical resistance as low as possible in the direction at right angles to the applied pressure direction when the carbonaceous material is pressurized and compressed to have a bulk density of 1 g/cm$^3$. This powder specific electrical resistance of the carbonaceous material is preferably 0.1 Ωcm or less, more preferably 0.07 Ωcm or less. If the powder specific electrical resistance of the carbonaceous material exceeds 0.1 Ωcm, the electrical conductivity of the cured product obtained by curing the composition decreases and a desired cured product tends to be hardly obtained.

FIG. 1 shows the method for measuring the specific electrical resistance of the carbonaceous material powder. In FIGS. 1, 1 and 1' are an electrode comprising a copper plate, 2 is a compression rod comprising a resin, 3 is a cradle, 4 is a side frame, the cradle and the side frame each comprising a resin, 5 is a carbonaceous material powder as the sample, and 6 is a voltage measuring terminal provided in the center in the direction perpendicular to the paper at the bottom of the sample.

The specific electrical resistance of the sample is measured as follows by using a four-terminal method shown in FIG. 1. The sample is compressed by the compression rod 2, and an electric current (I) is flowed to the electrode 1' from the electrode 1. The voltage (V) between terminals is measured by the terminal 6. The voltage used at this time is a value when the sample is compressed to a bulk density of 1.5 g/cm$^3$ by the compression rod. Assuming that the electric resistance of the sample (between terminals) is R (Ω), R=V/I is established. From this relationship, the specific electrical resistance can be determined according to $\rho = R \cdot S/L$ [$\rho$ is a specific electrical resistance, S is a cross-sectional area (cm$^2$) of the sample in the current-flow direction, namely, in the direction at right angles to the applied pressure direction, and L is a distance (cm) between terminals 6]. In the actual measurement, the cross-section of the sample in the direction at right angles has a width of about 1 cm and a length (height) of about 0.5 to 1 cm, the length in the current-flow direction is 4 cm, and the distance (L) between terminals is 1 cm.

Artificial Graphite

For obtaining the artificial graphite which is one example of the carbonaceous material (C) for use in the present invention, coke is usually produced first. Examples of the raw material used for the coke include petroleum-type pitch and coal-type pitch. The coke is produced by carbonizing such a raw material. A graphite powder is generally formed from the coke, for example, by a method of pulverizing the coke and then graphitizing the particle, a method of graphitizing the coke itself and then pulverizing it, or a method of adding a binder to the coke, molding and firing the mixture, graphitizing the fired product (the coke and this fired product are collectively called "coke or the like") and then pulverizing it into powder. Since the growth of a crystal therein is preferably hindered as much as possible, the coke or the like as the raw material is suitably heat-treated at 2,000° C. or less, preferably 1,200° C. or less.

The graphitization may be performed, for example, by a method using an Acheson furnace where the powder is placed in a graphite crucible and a current is flowed directly thereto, or a method of heating the powder by a graphite heating element.

The coke, artificial graphite, natural graphite or the like may be pulverized by using, for example, a high-speed rotary grinder (e.g., hammer mill, pin mill, cage mill), a ball mill of various types (e.g., rolling mill, vibrating mill, planetary mill) or a stirring mill (e.g., bead mill, attritor, circulating tube-type mill, annular mill). Also, a screw mill, a turbo mill, a supermicron mill and a jet mill, which are a fine pulverizer, may be used by selecting the conditions. The coke, natural graphite or the like is pulverized by using such a pulverizer and at this time, the average particle diameter or particle size distribution may be adjusted by selecting the pulverization conditions and, if desired, classifying the powder.

The method for classifying the coke powder, artificial graphite powder, natural graphite powder or the like is not particularly limited as long as the separation can be attained, but, for example, a sieving method or an air classifier such as forced vortex-type centrifugal classifier (e.g., micron separator, Turboplex, turbo classifier, super separator) and inertial classifier (e.g., modified virtual impactor, elbow jet) may be used. Furthermore, a wet precipitation and separation method, a centrifugal classification method or the like may also be used.

Expanded Graphite Powder

The expanded graphite powder is a powder obtained, for example, by dipping a graphite (e.g., natural graphite, thermally decomposed graphite) where a crystal structure is grown to a high level, in a strongly oxidizing solution such as a mixed solution of concentrated sulfuric acid and nitric acid or a mixed solution of concentrated sulfuric acid and hydrogen peroxide water, to produce a graphite intercalation compound, and washing and then rapidly heating the graphite to expand the C axis direction of the graphite crystal, or a powder obtained by once rolling the expanded graphite into a sheet form and then pulverizing it.

Carbon Fiber

The carbon fiber includes a pitch type produced from heavy oil, byproduct oil, coal tar or the like, and a PAN type produced from polyacrylonitrile.

The vapor grown carbon fiber can be obtained, for example, by using, as the raw material, an organic compound such as benzene, toluene and natural gas, and subjecting it to a thermal decomposition reaction together with a hydrogen gas at 800 to 1,300° C. in the presence of a transition metal catalyst such as ferrocene. The obtained carbon fiber is thereafter preferably further graphitized at about 2,500 to 3,200°

C., more preferably graphitized at about 2,500 to 3,200° C. together with a graphitization catalyst such as boron, boron carbide, beryllium, aluminum, and silicon.

The vapor grown carbon fiber for use in the present invention preferably has a fiber diameter of 0.05 to 10 µm and a fiber length of 1 to 500 µm, more preferably a fiber diameter of 0.1 to 5 µm and a fiber length of 5 to 50 µm, still more preferably a fiber diameter of 0.1 to 0.5 µm and a fiber length of 10 to 20 µm.

Carbon Nanotube

Carbon nanotube is recently attracting an attention in industry because of not only its mechanical strength but also its field emission function or hydrogen storage function. Furthermore, the magnetic function thereof is also being taken notice of. This type of carbon nanotube is also called graphite whisker, filamentous carbon, graphite fiber, ultrafine carbon tube, carbon tube, carbon fibril, carbon microtube, carbon nanofiber or the like. The carbon nanotube includes a single-layer carbon natotube where the graphite film forming the tube comprises one layer, and a multilayer carbon nanotube where the graphite film comprises multiple layers. In the present invention, a single-layer carbon nanotube and a multilayer carbon nanotube both may be used, but a single-layer carbon nanotube is preferred, because a cured product having higher electrical conductivity and higher mechanical strength tends to be obtained.

The carbon nanotube may be produced, for example, by an arc discharge method, a laser evaporation method or a thermal decomposition method described in Saito and Bando, *Carbon Nanotube no Kiso* (*Fundamentals of Carbon Nanotube*), pp. 23-57, Corona Shuppan (1998) and for elevating the purity, may be further purified by a hydrothermal method, a centrifugal separation method, an ultrafiltration method, an oxidation method or the like. Also, for removing impurities, the carbon nanotube is preferably treated at a high temperature of about 2,500 to 3,200° C. in an inert gas atmosphere, more preferably treated at a high temperature of about 2,500 to 3,200° C. in an inert gas atmosphere together with a graphitization catalyst such as boron, boron carbide, beryllium, aluminum and silicon.

The carbon nanotube for use in the present invention preferably has a fiber diameter of 0.5 to 100 nm and a fiber length of 0:01 to 10 µm, more preferably a fiber diameter of 1 to 10 nm and a fiber length of 0.05 to 5 µm, still more preferably a fiber diameter of 1 to 5 nm and a fiber length of 0.1 to 3 µm.

In the present invention, the fiber diameter and fiber length of the vapor grown carbon fiber or carbon nanotube are each a number average of diameters or lengths of hundreds of fibers on a photograph taken by a scanning electron microscope (SEM).

Carbon Black

Examples of the carbon black for use in the present invention include Ketjen black and acetylene black obtained by incomplete combustion of natural gas or the like or by thermal decomposition of acetylene; furnace carbon obtained by incomplete combustion of hydrocarbon oil or natural gas; and thermal carbon obtained by thermal decomposition of natural gas.

Boron

The boron contained in the carbonaceous material as the component (C) for use in the present invention is preferably contained in the carbon material in an amount of 0.05 to 10% by weight based on the entire mass of the carbonaceous material. If the boron content is less than 0.05% by weight, a graphite powder having high electrical conductivity intended to achieve by containing boron tends to be hardly obtained, whereas if the boron content exceeds 10% by weight, the improvement effect of enhancing the electrical conductivity of the carbon material is liable to decrease. The method for measuring the amount of boron contained in the carbonaceous material is not particularly limited, and the amount of boron may be measured by any measuring method. The value used in the present invention is a value measured by inductively coupled plasma emission spectroscopy (hereinafter simply referred to as "ICP") or inductively coupled plasma emission mass spectrometry (hereinafter simply referred to as "ICP-MS"). More specifically, the sample after adding thereto a sulfuric acid and a nitric acid is decomposed under microwave heating (230° C.) (digester method), further decomposed by adding perchloric acid ($HClO_4$) and then diluted with water, and the amount of boron is measured by using an ICP emission analyzer.

The carbonaceous material (C) for use in the present invention preferably contains from 0.05 to 10% by weight of boron. As for the method of incorporating boron, a B simple substance, $B_4C$, BN, $B_2O_3$, $H_3BO_3$ or the like is added as the boron source to one of natural graphite, artificial graphite, expanded graphite, carbon black, carbon fiber, vapor grown carbon fiber, carbon nanotube and the like or to a mixture of one or more thereof and then thoroughly mixed, and the mixture is graphitized at about 2,500 to 3,200° C., whereby boron can be incorporated into the carbonaceous material. If the mixing of the boron compound is not uniform, not only an inhomogeneous graphite powder results but also sintering occurs with high probability. For achieving uniform mixing of the boron compound, the boron source is preferably formed into a powder having a particle diameter of 50 µm or less, more preferably about 20 µm or less, and mixed with the powder of coke or the like.

If boron is not added, the graphitization degree (crystallization degree) may be decreased at the graphitization to cause expansion of the lattice spacing and a graphite powder having high electrical conductivity may not be obtained. As long as boron and/or a boron compound is mixed in graphite, how the boron is contained is not particularly limited, but it is preferred that boron is present between graphite crystal layers or a part of carbon atoms constituting the graphite crystal is substituted by a boron atom. In the case where a part of carbon atoms is substituted by a boron atom, the bonding between the boron atom and the carbon atom may take any bonding form such as covalent bonding or ion bonding.

Mass Ratio of Component A, Component B and Component C

The electrically conducting curable resin composition of the present invention comprises at least (A) a hydrocarbon compound having a plurality of carbon-carbon double bonds, (B) an elastomer excluding the component (A), and (C) a carbonaceous material. The mass ratio of the component (A) and the component (B) is from 20 to 98% by weight: from 80 to 2% by weight. If the component (B) exceeds 80% by weight, the strength and heat resistance of the cured product are decreased, whereas if it is less than 2% by weight, the effect obtainable by the addition of the elastomer excluding the component (A) may not be brought out. The mass ratio of the component (A) and the component (B) is preferably from 30 to 98% by weight: from 70 to 5% by weight, more preferably from 40 to 90% by weight: from 60 to 10% by weight. With respect to the carbonaceous material as the component (C), assuming that the sum of the component (A) and the component (B) is 100 parts by weight, the amount of the component (C) is from 40 to 1,900 parts by weight, preferably from 100 to 1,900 parts by weight, more preferably from 200 to 1,200 parts by weight, per the sum of 100 parts by weight. If the carbon material content is less than 40 parts by weight, the electrical conductivity of the cured product decreases, whereas if the carbon material content exceeds 1,900 parts by weight, the moldability tends to be worsened and this is not preferred.

Reactive Monomer

The electrically conducting curable resin composition of the present invention may comprise (D) a reactive monomer. The reactive monomer is not particularly limited and various reactive monomers may be used. For example, a radical reactive monomer containing an unsaturated double bond such as vinyl group and allyl group may be added for the purpose of, for example, controlling the reaction rate, adjusting the viscosity, enhancing the crosslinking density or imparting a function. Examples of the radical reactive monomer containing an unsaturated double bond such as vinyl group and allyl group include an unsaturated fatty acid ester, an aromatic vinyl compound, a vinyl ester of a saturated fatty acid or an aromatic carboxylic acid, a derivative of the vinyl ester, and a crosslinking polyfunctional monomer.

Unsaturated Fatty Acid Ester

Examples of the unsaturated fatty acid ester include an alkyl(meth)acrylate such as methyl(meth)acrylate, ethyl (meth)acrylate, butyl(meth)acrylate, 2-ethylhexyl(meth) acrylate, octyl(meth)acrylate, dodecyl(meth)acrylate, octadecyl(meth)acrylate, cyclohexyl(meth)acrylate and methylcyclohexyl(meth)acrylate; an acrylic acid aromatic ester such as phenyl(meth)acrylate, benzyl(meth)acrylate, 1-naphthyl(meth)acrylate, fluorophenyl(meth)acrylate, chlorophenyl(meth)acrylate, cyanophenyl(meth)acrylate, methoxyphenyl(meth)acrylate and biphenyl(meth)acrylate; a haloalkyl(meth)acrylate such as fluoromethyl(meth)acrylate and chloromethyl(meth)acrylate; glycidyl(meth)acrylate, alkylamino(meth)acrylate, and α-cyanoacrylic acid ester.

Aromatic Vinyl Compound, etc.

Examples of the aromatic vinyl compound include styrene, α-methylstyrene, chlorostyrene, styrenesulfonic acid, 4-hydroxystyrene, vinyltoluene, vinylnaphthalene, acenaphthylene, 4-vinylbiphenyl and 1,1-diphenylethylene.

Examples of the vinyl ester of a saturated fatty acid or an aromatic carboxylic acid and the derivative thereof include vinyl acetate, vinyl propionate and vinyl benzoate.

Crosslinking Polyfunctional Monomer

Examples of the crosslinking polyfunctional monomer include a di(meth)acrylate such as ethylene glycol di(meth) acrylate, diethylene glycol di(meth)acrylate, triethylene glycol di(meth)acrylate, tetraethylene glycol di(meth)acrylate, tripropylene glycol di(meth)acrylate, 1,3-butylene glycol di(meth)acrylate, 1,4-butanediol di(meth)acrylate, 1,5-pentadiol di(meth)acrylate, 1,6-hexadiol di(meth)acrylate, neopentyl glycol di(meth)acrylate, oligoester di(meth)acrylate, polybutadiene di(meth)acrylate, 2,2-bis(4-(meth)acryloyloxyphenyl)propane and 2,2-bis(4-ω-(meth)acryloyloxypyriethoxy)phenyl)propane; aromatic diallyl carboxylates such as diallyl phthalate, diallyl isophthalate, dimethallyl isophthalate, diallyl terephthalate, diallyl 2,6-naphthalenedicarboxylate, diallyl 1,5-naphthalenedicarboxylate, diallyl 1,4-xylenedicarboxylate and diallyl 4,4'-diphenyldicarboxylate; a bifunctional crosslinking monomer such as diallyl cyclohexanedicarboxylate, divinylbenzene, divinylbiphenyl and 1,4-diisopropylbenzene; a trifunctional crosslinking monomer such as trimethylolethane tri(meth)acrylate, trimethylolpropane tri(meth)acrylate, pentaerythritol tri(meth) acrylate, tri(meth)allyl isocyanurate, tri(meth)allyl cyanurate, triallyl trimellitate and diallyl chlorendate; and a tetrafunctional crosslinking monomer such as pentaerythritol tetra(meth)acrylate.

Among these reactive monomers (D), a crosslinking polyfunctional monomer is preferably added for enhancing the heat resistance, hot water resistance and the like. Also, a reactive monomer having a bond site prone to hydrolysis, such as ester bond and urethane bond, is preferably used in a small amount so as to avoid hydrolysis due to hot water but may be used in an appropriate amount in view of balance with other physical properties.

Assuming that the sum of the hydrocarbon compound (A) having a plurality of carbon-carbon double bonds and the elastomer (B) excluding the component (A) is 100 parts by weight, the reactive monomer (D) is preferably used in an amount of 1 to 40 parts by weight, more preferably from 2 to 30 parts by weight, still more preferably from 3 to 25 parts by weight, per the sum of 100 parts by weight. If the reactive monomer (D) content exceeds 40 parts by weight, the hot water resistance of, for example, the cured product or molded article of the present invention may be insufficient or the moldability may be deteriorated.

Additive

For the purpose of enhancing the hardness, strength, electrical conductivity, moldability, durability, weather resistance, water resistance and the like, additives such as lubricant, thickener, crosslinking agent, crosslinking aid, curing initiator, curing accelerator, curing retardant, plasticizer, low shrinking agent, thixotropic agent, surfactant, solvent, glass fiber, inorganic fiber filler, organic fiber, ultraviolet stabilizer, antioxidant, defoaming agent, leveling agent, mold-releasing agent, water repellent and hydrophilicity-imparting agent may be added, if desired, to the electrically conducting curable resin composition of the present invention.

The curing initiator is preferably an organic peroxide or a compound capable of generating a radial by the effect of heat, such as azo compound. As for the organic peroxide, a known organic peroxide such as dialkyl peroxide, acyl peroxide, hydroperoxide, ketone peroxide and peroxyester may be used. Specific examples thereof include benzoyl peroxide, 1,1-bis(tert-butylperoxy)cyclohexane, 2,2-bis(4,4-dibutylperoxycyclohexyl)propane, tert-butylperoxy-2-ethylhexanate, 2,5-dimethyl-2,5-bis(tert-butylperoxy)hexane, 2,5-dimethyl-2,5-bis(benzoylperoxy)hexane, tert-butylperoxy benzoate, tert-butylcumyl peroxide, p-methane hydroperoxide, p-butyl hydroperoxide, cumene hydroperoxide, dicumyl peroxide, di-tert-butyl peroxide and 2,5-dimethyl-2,5-bis (tert-butylperoxy)hexine-3. One of these curing initiators may be used alone or two or more thereof may be used as a mixture.

Assuming that the sum of the hydrocarbon compound (A) having a plurality of carbon-carbon double bonds and the elastomer (B) excluding the component (A) is 100 parts by mass, the organic peroxide which is contained, if desired, in the electrically conducting curable resin composition of the present invention is preferably added in an amount of 0.2 to 10 parts by weight, more preferably from 0.5 to 8 parts by weight, still more preferably from 0.8 to 6 parts by weight, per the sum of 100 parts by weight. If the organic peroxide content exceeds 10 parts by weight, a gas generated due to decomposition of the organic peroxide may increase to cause reduction in the airtightness of the cured product, whereas if it is less than 0.2 parts by weight, the crosslinking density of the cured product decreases and this may cause reduction in the strength and also in the durability.

Production Process of Electrically Conducting Curable Resin Composition

The electrically conducting curable resin composition of the present invention is not particularly limited in its production process but, for example, in the production of the curable composition, the above-described components are preferably mixed as uniformly as possible while keeping constant the temperature in the range of not allowing for initiation of curing, by using a mixer or kneader commonly employed in the resin field, such as roll, extruder, kneader, Banbury mixer, Henschel mixer and planetary mixer. In the case of adding an organic peroxide, the organic peroxide is preferably added and mixed at the final stage after all other components are uniformly mixed.

After the kneading or mixing, the electrically conducting curable resin composition of the present invention may be pulverized or granulated for the purpose of facilitating the supply of the material to a mold-forming machine or a mold. The pulverization may be performed by using a homogenizer, a Wiley mill, a high-speed rotary grinder (e.g., hammer mill, pin mill, cage mill, blender) or the like and is preferably performed under cooling so as to prevent aggregation of materials with each other. The granulation may be performed, for example, by a method of pelletizing the composition with use of an extruder, a ruder, a co-kneader or the like or by a method using a pan-type granulator.

Molding of Electrically Conducting Curable Resin Composition

In the present invention, the method for molding the electrically conducting curable resin composition is not particularly limited, but a method such as compression molding, transfer molding, injection molding and injection-compression molding may be used. For example, in order to obtain a cured product with good thickness precision from the electrically conducting curable resin composition of the present invention, the composition is once formed into a sheet having a predetermined thickness and a predetermined width at a temperature of not allowing for initiation of curing by using an extruder, a roll, a calender or the like. For more elevating the thickness precision, the sheet after molding by an extruder is preferably rolled by a roll or a calender. The extrusion molding is preferably performed in a vacuum state so as to eliminate a void or air from the sheet.

After cutting or punching the obtained sheet into a desired size, one sheet is inserted into a double-side grooved mold or two or more sheets are inserted to lie in parallel or overlap one on another, and the sheet(s) is thermally cured by a compression-molding machine, whereby a cured product is obtained. At the curing, the pressure inside the cavity is preferably reduced to vacuum so as to obtain a defectless product. After curing, for remedying warpage of the product, the cured product is preferably cooled while applying a pressure of 3 MPa or more by a pressing plate controlled to a temperature of 10 to 50° C.

Curing

As for the curing conditions, the optimal temperature may be selected or explored according to the kind of the electrically conducting curable resin composition. For example, the conditions may be appropriately determined in the temperature range from 120 to 300° C. and in the curing time range from 5 seconds to 2,700 seconds. After curing, the cured product may be subjected, if desired, to after-cure at a temperature of 150 to 200° C. for 10 to 600 minutes, whereby complete curing can be achieved. By performing the after-cure under a pressure of 5 MPa or more, the product can be prevented from warpage.

Physical Properties of Electrically Conducting Cured Product

The electrically conducting cured product of the present invention preferably has a flexural strength of 30 MPa or more, more preferably 35 MPa or more, still more preferably 40 MPa or more. If the flexural strength is less than 30 MPa, the cured product tends to have insufficient strength. The flexural strength is measured by the method prescribed in JIS K6911. More specifically, a specimen (80 mm×10 mm×4 mm) is measured by a three-point flexural strength measuring method under the conditions such that the span interval is 64 mm and the bending rate is 2 mm/min.

The electrically conducting cured product of the present invention preferably has a volume resistivity of $2 \times 10^{-2}$ Ωcm or less, more preferably $8 \times 10^{-3}$ Ωcm or less, still more preferably $5 \times 10^{-3}$ Ωcm or less. If the volume resistivity exceeds $2 \times 10^{-2}$ Ωcm, satisfactory electrical conductivity may not be obtained and this is not preferred. The volume resistivity is measured by a four-probe method according to JIS K7194.

The electrically conducting cured product of the present invention preferably has a contact resistance of $2 \times 10^{-2}$ Ωcm$^2$ or less, more preferably $1 \times 10^{-2}$ Ωcm$^2$ or less, still more preferably $7 \times 10^{-3}$ Ωcm$^2$ or less. If the contact resistance exceeds $2 \times 10^{-2}$ Ωcm$^2$, satisfactory electrical conductivity tends to be hardly obtained. The contact resistance is determined as follows. A specimen (20 mm×20 mm×2 mm) and a carbon plate ($1.5 \times 10^{-3}$ Ωcm, 20 mm×20 mm×1 mm) are contacted and sandwiched by two copper plates, and a load of 98N is applied thereto. A constant current of 1 A is flowed in the penetration direction and after contacting plus and minus terminals with the interface between the specimen and the carbon plate, the voltage is measured. The resistance value is calculated from the measured voltage and integrated with the contacting cross-sectional area, and the obtained value is defined as the contact resistance value.

The electrically conducting cured product of the present invention preferably has a resistivity in the penetration direction (indicating a volume resistivity in the penetration direction) of $2 \times 10^{-2}$ Ωcm or less, more preferably $15 \times 10^{-3}$ Ωcm or less, still more preferably $10 \times 10^{-3}$ Ωcm or less. If the resistivity in the penetration direction exceeds $2 \times 10^{-2}$ Ωcm, when the electrically conducting cured product is formed into a plate shape, satisfactory electrical conductivity may not be obtained in the plate thickness direction (penetration direction) and this is not preferred. The resistivity in the penetration direction is determined as follows. Four sheets of a specimen (50 mm×50 mm×2 mm) are contacted and sandwiched by electrodes (100 mm×50 mm×0.3 mm) each comprising a gold-plated copper plate, and a load of 2 MPa is applied thereto. A constant current of 1 A is flowed in the penetration direction, and the voltage between gold-plated electrodes is measured, thereby measuring the resistance (measured value: Ra). Subsequently, using two sheets of the same specimen, the resistance value is measured by the same operation (measured value: Rb). From these measured values, according to the following formula:

$$\text{Resistivity in penetration direction} = (Ra - Rb) \times (\text{area of specimen})/[(4-2) \times (\text{thickness of specimen})],$$

the resistivity in the penetration direction is calculated.

The electrically conducting cured product of the present invention preferably has a thermal conductivity of 1.0 W/m·K or more, more preferably 4.0 W/m·K or more, still more preferably 10 W/m·K or more. If the thermal conductivity is less than 1.0 W/m·K, the material is deteriorated in the heat-dissipating property and reaches a high temperature during use and this is not preferred. The thermal conductivity can be measured according to the laser-flash method ($t_{1/2}$ method, using a thermal constant measuring apparatus for laser-flash method, LF/TCM FA8510B, manufactured by Rigaku Denki Co.) by using a specimen (φ: 10 mm, thickness: 1.7 mm) under the conditions such that the temperature is 80° C., the atmosphere is a vacuum and the light irradiated is a ruby laser beam (excitation voltage: 2.5 kV).

Hot Water Resistance

The electrically conducting cured product of the present invention is preferably characterized in that the hot resistance can be elevated. The index for the hot water resistance includes, for example, water absorption and mass change ratio. These can be measured by the method according to JIS K7202.

For example, a specimen in a certain size is placed in a pressure container, a certain volume of distilled water is added thereto, a test is performed for a certain time in an oven at a certain temperature, and the change of mass of the specimen between before and after the test is measured, whereby the hot water resistance can be determined.

The electrically conducting cured product of the present invention preferably exhibits a mass change ratio of −1.5% to +15%, more preferably −1.0% to +1.0%, after the test at 150° C. for 1,562 hr under the conditions such that the specimen size is 30 mm×30 mm×3 mm and 50 ml of distilled water is added.

If the mass change ratio is less than −1.5% or exceeds +1.5%, the mass is greatly changed on use for a long time and this disadvantageously brings about great change in the dimension of a molded article. Also, if the mass change ratio is less than −1.5%, the material may deteriorate to cause many flaws or cracks and this is particularly not preferred.

The electrically conducting cured product of the present invention preferably keeps good balance between flexural strength (at break) and bending strain (at break). A cured product having only high flexural strength becomes a brittle material, and a cured product having only high strain is poor in the strength. Therefore, a cured product balanced between flexural strength and bending strain is preferably produced. Also from this standpoint, the electrically conducting cured product obtained by using the electrically conducting curable resin composition of the present invention exhibits an excellent performance balanced between flexural strength and bending strain.

Electrically Conducting Molded Article

The electrically conducting molded article obtained from the electrically conducting curable resin composition of the present invention has been developed particularly for the purpose of producing, for example, a fuel cell separator or a current collector or electrode for battery, though the application is not limited thereto, and this electrically conducting molded article is useful as a fuel cell separator or a current collector or electrode for battery.

In the electrically conducting molded article of the present invention where a flow channel for flowing a gas is formed on both surfaces or one surface, examples of the gas flowed include air, oxygen, hydrogen, nitrogen and water vapor. The shape and size of the gas flow channel can be appropriately selected according to usage and size of the molded article.

The electrically conducting molded article of the present invention preferably has a flexural strength of 30 MPa or more, more preferably 35 MPa or more, still more preferably 40 MPa or more. If the flexural strength is less than 30 MPa, the molded article tends to fail in having sufficiently high strength.

The electrically conducting molded article of the present invention preferably has a volume resistivity of $2\times10^{-2}$ $\Omega$cm or less, more preferably $8\times10^{-3}$ $\Omega$cm or less, still more preferably $5\times10^{-3}$ $\Omega$cm or less. If the volume resistivity exceeds $2\times10^{-2}$ $\Omega$cm, satisfactory electrical conductivity may not be obtained and this is not preferred.

The electrically conducting molded article of the present invention preferably has a contact resistance of $2\times10^{-2}$ $\Omega$cm$^2$ or less, more preferably $1\times10^{-2}$ $\Omega$cm$^2$ or less, still more preferably $7\times10^{-3}$ $\Omega$cm$^2$ or less. If the contact resistance exceeds $2\times10^{-2}$ $\Omega$cm$^2$, the molded article may fail in having satisfactory electrical conductivity and this is not preferred.

The electrically conducting molded article of the present invention preferably has a resistivity in the penetration direction (indicating a volume resistivity in the penetration direction) of $2\times10^{-2}$ $\Omega$cm or less, more preferably $15\times10^{-3}$ $\Omega$cm or less, still more preferably $10\times10^{-3}$ $\Omega$cm or less. If the resistivity in the penetration direction exceeds $2\times10^{-2}$ $\Omega$cm, when the electrically conducting cured product is formed into a plate shape, satisfactory electrical conductivity may not be obtained in the plate thickness direction (penetration direction) and this is not preferred.

The electrically conducting molded article of the present invention preferably has a thermal conductivity of 1.0 W/m$\Omega$K or more, more preferably 4.0 W/m·K or more, still more preferably 10 W/m·K or more. If the thermal conductivity is less than 1.0 W/m·K, the load on the material increases and this is not preferred.

The electrically conducting molded article of the present invention can be obtained by curing and molding the electrically conducting curable resin composition of the present invention by a molding method such as compression molding, transfer molding, injection molding or injection-compression molding.

For more specifically describing this, a fuel cell separator obtained from the electrically conducting curable resin composition of the present invention, where a flow channel for flowing a gas is formed on both surfaces or one surface, is described in detail below. The shape and size of the flow channel of the separator obtained by the present invention may be appropriately selected according to the size and shape of the separator itself, the flow rate of gas, and the like. In general, the cross-section of flow channel is rectangular, the depth is around 0.5 mm and the width is around 1.0 mm, but the present invention is not limited thereto.

The fuel cell separator of the present invention, where a flow channel for flowing a gas is formed on both surfaces or one surface, preferably has a flexural strength of 30 MPa or more, more preferably 35 MPa or more, still more preferably 40 MPa or more. If the flexural strength is less than 30 MPa, the obtained fuel cell separator tends to have insufficient strength.

The fuel cell separator of the present invention, where a flow channel for flowing a gas is formed on both surfaces or one surface, preferably has a volume resistivity of $2\times10^{-2}$ $\Omega$cm or less, more preferably $8\times10^{-3}$ $\Omega$cm or less, still more preferably $5\times10^{-3}$ $\Omega$cm or less. If the volume resistivity exceeds $2\times10^{-2}$ $\Omega$cm, satisfactory electrical conductivity may not be obtained and this is not preferred.

The fuel cell separator of the present invention, where a flow channel for flowing a gas is formed on both surfaces or one surface, preferably has a contact resistance of $2\times10^{-2}$ $\Omega$cm$^2$ or less, more preferably $1\times10^{-2}$ $\Omega$cm$^2$ or less, still more preferably $7\times10^{3}$ $\Omega$cm$^{-2}$ or less. If the contact resistance exceeds $2\times10^{-2}$ $\Omega$cm$^2$, the fuel cell separator may fail in having satisfactory electrical conductivity and this is not preferred.

The fuel cell separator of the present invention, where a flow channel for flowing a gas is formed on both surfaces or one surface, preferably has a resistivity in the penetration direction (indicating a volume resistivity in the penetration direction) of $2\times10^{-2}$ $\Omega$cm or less, more preferably $15\times10^{-3}$ $\Omega$cm or less, still more preferably $10\times10^{-3}$ $\Omega$cm or less. If the resistivity in the penetration direction exceeds $2\times10^{-2}$ $\Omega$cm, when the electrically conducting cured product is formed into a plate shape, satisfactory electrical conductivity may not be obtained in the plate thickness direction (penetration direction) and this is not preferred.

The fuel cell separator of the present invention, where a flow channel for flowing a gas is formed on both surfaces or one surface, preferably has a thermal conductivity of 1.0 W/m·K or more, more preferably 4.0 W/m·K or more, still more preferably 10 W/m·K or more. If the thermal conductivity is less than 1.0 W/m·K, the material is deteriorated in the heat-dissipating property and reaches a high temperature during use and this is not preferred. Furthermore, the control for keeping constant the operation temperature disadvantageously becomes difficult due to generation of heat from the fuel cell separator.

Production Method of Fuel Cell Separator

The production method of the fuel cell separator is not particularly limited. Specific examples of the production method include, but are not limited to, a compression molding method, a transfer molding method, an injection molding method, a cast molding method and an injection-compression molding method. The molding is preferably performed by keeping the inside of the mold or the entire mold in a vacuum state at the mold-processing.

The fuel cell separator of the present invention, where a flow channel for flowing a gas is formed on both surfaces or one surface, can be obtained by curing and molding the curable composition of the present invention by a molding method for general thermosetting resin. As for the flow channel for flowing a gas, the flow channel (e.g., groove) may be formed by machining after once curing the curable composition of the present invention. Furthermore, the curing of curable composition and the formation of gas flow channel may be simultaneously performed by compression molding or the like using a mold having an inverted shape of the gas flow channel.

Specific examples of the production method for the fuel cell separator include, but are not limited to, a compression molding method, a transfer molding method, an injection molding method, a cast molding method and an injection-compression molding method. The molding is preferably performed by keeping the inside of the mold or the entire mold in a vacuum state at the mold-processing.

In order to elevate the molding cycle in the compression molding, a multicavity mold is preferably used. More preferably, when a multistage press (laminating press) method is used, a large number of products can be molded with a small output. For enhancing the surface precision of a planar product, the compression molding is preferably performed after once molding an uncured sheet.

In the injection molding, for the purpose of more enhancing the moldability, molding in a supercritical state may be performed by injecting a carbonic acid gas in the middle of a cylinder of the molding machine and dissolving it in the material. In order to enhance the surface precision of the product, an injection-compression method is preferably used. Examples of the injection-compression method include a method of injecting the material into the mold in the opened state and then closing the mold, a method of injecting the material while closing the mold, and a method of injecting the material into the mold with a clamping force of zero and then applying the clamping force.

As for the mold temperature, it is important to select or explore an optimal temperature according to the kind of the electrically conducting curable resin composition. The conditions may be appropriately selected in the temperature range from 120 to 300° C. and in the curing time range from 5 seconds to 2,700 seconds. After curing, the cured product may be subjected, if desired, to after-cure at a temperature of 150 to 200° C. for 10 to 600 minutes, whereby complete curing can be achieved. By performing the after-cure under a pressure of 5 MPa or more, the product can be prevented from warpage.

The electrically conducting curable resin composition of the present invention can be easily mold-formed and therefore, is optimal as a composite material in the field where thickness precision is required. Furthermore, the cured product obtained therefrom is assured of very high performance such that the electrical conductivity or thermal conductivity of graphite can be unlimitedly reproduced and the heat resistance, hot water resistance, corrosion resistance and molding precision are excellent. The usage of such an electrically conducting curable resin composition or cured product is not particularly limited, but specific examples of the usage include a fuel cell separator, an electrode, an electromagnetic shield, a heat-dissipating material, a current collector for battery, an electron circuit board, a resistor, a heater, a dust collecting filter element, a planar heating element and an electromagnetic material.

EXAMPLES

The present invention is described in greater detail below by referring to Examples, but the present invention is not limited to these Examples.

The materials used in Examples are as follows.

Component (A): hydrocarbon compound having a plurality of carbon-carbon double bonds

<A-1>

1,2-Polybutadiene, B-3000, produced by Nippon Soda Co., Ltd. (molecular weight, 3,000, 1,2-bond: 91.7%, viscosity at 50° C.: 10.7 Pa·s)

<A-2>

1,2-Polybutadiene, RB-810, produced by JSR Corp. (melt index at 150° C. and 21.2N: 3 g/10 min, 1,2-bond: 90%)

<A-3>

SIS (styrene isoprene copolymer), HYBRAR 5125, produced by Kuraray Co., Ltd. (Melt index at 190° C. and 2.16 kg: 4 g/10 min)

Component (B): elastomer excluding component (A)

<B-1>

Hydrogenated NBR (hydrogenated acrylonitrile butadiene rubber), Zetpol 2000, produced by Nippon Zeon Co., Ltd. (iodine value: <7 mg/100 mg, Mooney viscosity: 70)

<B-2>

Ethylene butene copolymer, ENR 7380, produced by DuPont Dow Elastomer (melt index at 190° C. and 2.16 kg: 0.5 g/10 min)

<B-3>

Ethylene octene copolymer, 8842, produced by DuPont Dow Elastomer (melt index at 190° C. and 2.16 kg: 10 g/10 min)

Component(C): carbonaceous material

<C-1>: fine boron-containing graphite particle

LPC-S Coke (hereinafter referred to as "Coke A") produced by Nippon Steel Corp., which is non-needle type coke, was coarsely ground into a size of 2 to 3 mm by a pulverizer [manufactured by Hosokawa Micron Corp.]. This coarsely ground product was pulverized by a jet mill (IDS2UR, manufactured by Nippon Pneumatic Mfg. Co., Ltd.). Thereafter, the powder was adjusted to a desired particle diameter by classification. The particle of 5 or less was removed by air-classification using a turbo-classifier (TC15N, manufactured by Nisshin Engineering K.K.). To a part (14.4 kg) of this pulverized product having an adjusted particle diameter, 0.6 kg of boron carbide ($B_4C$) was added and mixed in a Henschel mixer at 800 rpm for 5 minutes. This mixed powder was encapsulated in a graphite crucible with a cover having an internal diameter of 40 cm and a volume of 40 liter, the crucible was placed in a graphitization furnace using a graphite heater, and the powder was graphitized at a temperature of 2,900° C. in an argon atmosphere. The graphitized powder was left standing to cool and taken out to obtain 14 kg of powder. The obtained fine graphite powder had an average particle diameter of 20.5 μm and a B content of 1.3% by weight.

<C-2>: fine graphite powder not containing boron

Coke A was coarsely ground into a size of 2 to 3 mm by a pulverizer. This coarsely ground product was pulverized by a jet mill. Thereafter, the powder was adjusted to a desired particle diameter by classification. The particle of 5 μm or less was removed by air-classification using a turbo-classifier. This powder was encapsulated in a graphite crucible with a cover having an internal diameter of 40 cm and a volume of 40 liter, the crucible was placed in a graphitization furnace using a graphite heater, and the powder was graphitized at a temperature of 2,900° C. The graphitized powder was left standing to cool and taken out to obtain a fine graphite powder. The obtained fine graphite powder had an average particle diameter of 20.5 μm and a B content of 0% by weight.

<C-3>: vapor grown carbon fiber

As for the vapor grown carbon fiber (hereinafter simply referred to as "VGCF" (registered trademark of Showa Denko K.K.)), VGCF-G (fiber diameter: 0.1 to 0.3 μm, fiber length: 10 to 50 μm) produced by Showa Denko K.K. was used.

<C-4>: carbon nanotube

The carbon nanotube (hereinafter simply referred to as "TNT") was obtained by the following method.

A hole having a diameter of 3 mm and a depth of 30 mm was bored in a graphite rod having a diameter of 6 mm and a length of 50 mm from the distal end along the center axis, and the hole was packed with a mixed powder of rhodium (Rh):platinum (Pt):graphite (C)=1:1:1 (by mass) to produce an anode. Separately, a cathode having a diameter of 13 mm and a length of 30 mm and comprising graphite having a purity of 99.98% by weight was produced. These electrodes were disposed in a reaction vessel to oppose each other and connected to a direct current power supply. The inside of the reaction vessel was replaced with helium gas having a purity of 99.9 vol %, and direct current arc discharge was performed. Thereafter, the soot attached to the inner wall of the reaction vessel (chamber soot) and the soot accumulated on the cathode (cathode soot) were collected. The pressure in the reaction vessel and the electric current were 600 Torr and 70 A, respectively. During the reaction, the anode and the cathode were operated to always give a gap of 1 to 2 mm therebetween.

The soot collected was charged into a mixed solvent of water and ethanol (1:1 by weight) and then ultrasonically dispersed. The resulting liquid dispersion was recovered, and the solvent was removed by using a rotary evaporator. The thus-obtained sample was ultrasonically dispersed in a 0.1% by weight aqueous solution of benzalkonium chloride as a cationic surfactant and then subjected to centrifugal separation at 5,000 rpm for 30 minutes, and the resulting liquid dispersion was recovered. Furthermore, the liquid dispersion was heat-treated in air at 350° C. for 5 hours and thereby purified to obtain a carbon nanotube having a fiber diameter of 1 to 10 nm and a fiber length of 0.05 to 5 μm.

Component (D): reactive monomer

<D-1>

Divinylbenzene, DVB-960, produced by Nippon Steel Chemical Co Ltd. (a product having a 1,4-divinylbenzene content or 95 to 97%)

<D-2>

Divinylbiphenyl, produced by Nippon Steel Chemical Co., Ltd., 3,3'-divinylbiphenyl content: 98% or more <Curing Initiator>

Dicumyl peroxide, Percumyl D, produced by NOF Corp.
2,5-Dimethyl-2,5-bis(tert-butylperoxy)hexane, Perhexa 25B, produced by NOF Corp.

<Thermosetting Resin>

Phenol resin, BRL-274, a resol resin produced by Showa Highpolymer Co., Ltd. (viscosity at 20° C.: 25 Pa·s, nonvolatile content: 75%)

The formulation (weight ratio) of each curable resin composition in Examples and Comparative Examples is shown in Table 1 below.

TABLE 1

Formulation of Electrically Conducting Curable Resin Composition (mass ratio)

| | | | Example | | | | | | | Comparative Example | | | |
|---|---|---|---|---|---|---|---|---|---|---|---|---|---|
| | | | 1 | 2 | 3 | 4 | 5 | 6 | 7 | 1 | 2 | 3 | 4 |
| Component (A) | <A-1> | B-3000 | 70 | 70 | 31 | 50 | 50 | 70 | 70 | 58 | | 70 | |
| | <A-2> | RB-810 | | | 31 | 12 | 12 | | | 42 | | | |
| | <A-3> | SIS | | | | 19 | 19 | 19 | | | | | |
| Component (B) | <B-1> | Hydrogenated NBR | 30 | 30 | 19 | | | 30 | 30 | | 100 | 30 | |
| | <B-2> | Ethylene butene copolymer | | | | 19 | | | | | | | |
| | <B-3> | Ethylene octene copolymer | | | | | 19 | | | | | | |
| Component (D) | <D-1> | Divinylbenzene | | 5 | | | | | | 5 | | | |
| | <D-2> | Divinylbiphenyl | 5 | | 5 | 5 | 5 | 5 | 5 | | 5 | 5 | |
| Thermosetting resin | | Phenol resin | | | | | | | | | | | 100 |
| Curing initiator | | Percumyl D | | | | | | | | 4 | | | |
| | | Perhexa 25B | 5 | 5 | 5 | 5 | 5 | 5 | 5 | | 5 | 5 | |
| Component (C) | <C-1> | | 600 | 600 | 770 | 770 | 770 | 550 | 550 | 600 | 600 | | 500 |
| | <C-2> | | | | | | | | | | | 600 | |
| | <C-3> | | | | | | | 50 | | | | | |
| | <C-4> | | | | | | | | 50 | | | | |

Examples 1 to 7 and Comparative Examples 2 and 3

The raw materials according to the formulation shown in Table 1 were kneaded by using a kneader at a temperature of 100° C. for 5 minutes, and the kneaded matter was charged into a mold capable of molding a flat plate of 100 mm×100 mm (the thickness varies for every item of the physical property test) and heated-cured under pressure at a mold temperature of 180° C. and at a pressure of 30 MPa for 8 minutes by using a 50-ton compression molding machine to obtain a cured product.

Comparative Example 1

The raw materials according to the formulation shown in Table 1 were kneaded by using a kneader at a temperature of 90° C. for 5 minutes, and the kneaded matter was charged into a mold capable of molding a flat plate of 100 mm×100 mm (the thickness varies for every item of the physical property test) and heated-cured under pressure at a mold temperature of 170° C. and at a pressure of 30 MPa for 18 minutes by using a 50-ton compression molding machine to obtain a cured product.

Comparative Example 4

The raw materials according to the formulation shown in Table 1 were kneaded by using a kneader at a temperature of 80° C. for 15 minutes, and the kneaded matter was charged into a mold capable of molding a flat plate of 100 mm×100 mm (the thickness varies for every item of the physical property test) and heated-cured under pressure at a mold temperature of 180° C. and at a pressure of 30 MPa for 7 minutes by using a 50-ton compression molding machine to obtain a cured product.

The physical properties of each cured product obtained in Examples and Comparative Examples were measured and the results are shown in Table 2 below.

factured by Takeda Riken, thereby measuring the resistance (measured value: Ra). Subsequently, using two sheets of the same specimen, the resistance value was measured by the same operation (measured value: Rb). From these measured values, according to the following formula:

Resistivity in penetration direction=$(Ra-Rb)$×(area of specimen)/[(4−2)×(thickness of specimen)], the resistivity in the penetration direction was calculated.

The flexural strength and bending strain were measured by using an autograph (AG-10kNI) manufactured by Shimadzu Corp. According to the method prescribed in JIS K6911, a specimen (80 mm×10 mm×4 mm) was measured by a three-point flexural strength measuring method under the conditions such that the span interval was 64 mm and the bending rate was 2 mm/min.

The hot water resistance was measured according to JIS K7209. A specimen (30 mm×30 mm×3 mm) was placed in a fluororesin-made vessel, 50 ml of distilled water was added thereto, the vessel was placed in a SUS316L-made pressure container, and the test was performed for 1,562 hours while rotating the container in an oven at 150° C. The mass was measured before and after the test and the mass change ratio was calculated.

As shown in Table 2, the cured product and molded article obtained by using the electrically conducting curable resin composition of the present invention were excellent in hot water resistance, heat resistance, mechanical strength and electrical conductivity, and the flowability at molding was also good.

Example 8

The composition used in Example 3 was charged into a mold capable of molding a flat plate having a size of 280× 200×1.5 mm and having 1 mm-pitch grooves on both surfaces and cured under pressure of 60 MPa at a mold temperature of

TABLE 2

| | | \multicolumn{7}{c}{Physical Properties} | | | | |
|---|---|---|---|---|---|---|---|---|---|---|---|---|
| | | \multicolumn{7}{c}{Example} | \multicolumn{4}{c}{Comparative Example} |
| | | 1 | 2 | 3 | 4 | 5 | 6 | 7 | 1 | 2 | 3 | 4 |
| Volume resistivity | mΩ·cm | 4.7 | 4.8 | 5.2 | 4.9 | 5.2 | 4.7 | 5.1 | 7.4 | 5.9 | 19.2 | 7.7 |
| Resistivity in penetration direction | mΩ·cm | 9.4 | 9.9 | 8.7 | 9.5 | 9.8 | 9.7 | 9.8 | 19.9 | 16.1 | 50.3 | 35.2 |
| Flexural strength | MPa | 30.7 | 30.5 | 53.2 | 54.3 | 53.3 | 32.0 | 31.4 | 46.7 | 24.7 | 31.3 | 77.8 |
| Bending strain | % | 1.68 | 1.77 | 1.39 | 1.25 | 1.03 | 1.55 | 1.60 | 1.04 | 2.05 | 1.58 | 0.32 |
| Hot water resistance test, mass change ratio | % | −0.34 | −0.39 | −0.17 | −0.08 | −0.07 | −0.37 | −0.33 | −0.07 | −2.38 | −0.36 | 1.80 |

The measuring methods of physical properties of the cured product are described below.

The volume resistivity was measured by a four-probe method according to JIS K7194.

Figure 2:
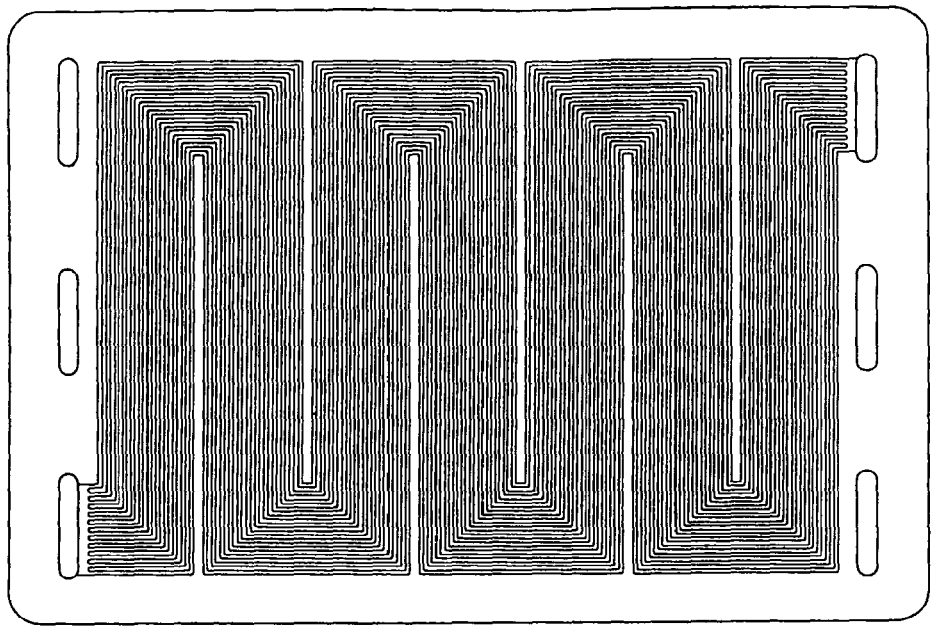
FIG. 2 illustrates a view showing a flat plate in the form of double-side grooved fuel cell separator produced in Example 8.
Figure 2:
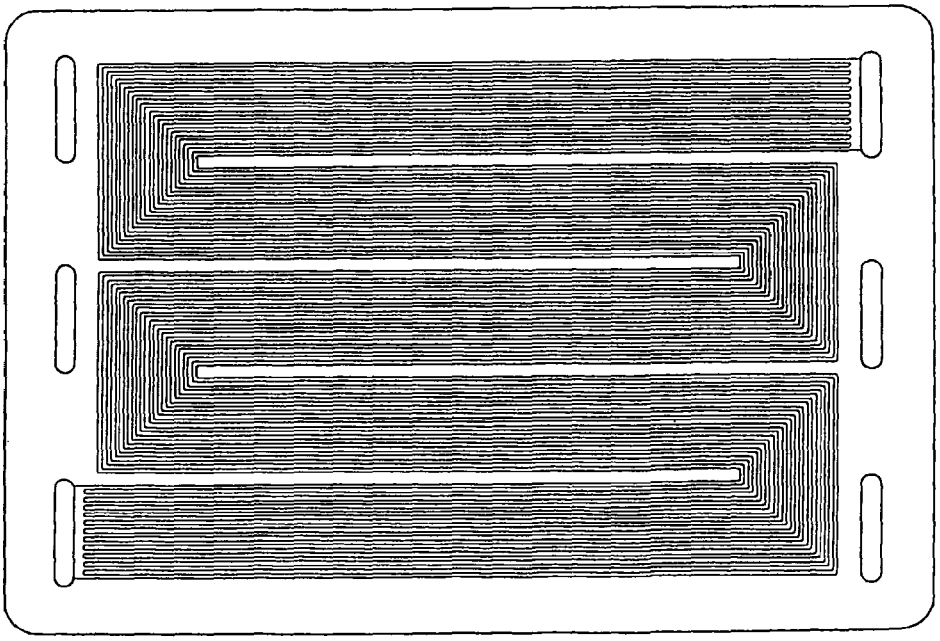

The resistivity in the penetration direction was determined as follows. Four sheets of a specimen (50 mm×50 mm×2 mm) were contacted and sandwiched by electrodes (100 mm×50 mm×0.3 mm) each comprising a gold-plated copper plate, and a load of 2 MPa was applied thereto by using TENSILON UTM-5T manufactured by Toyo Baldwin. A constant current of 1 A was flowed in the penetration direction by using a constant current generator (CCP10-1MR) manufactured by Takasago Ltd., and the voltage between gold-plated electrodes was measured by a digital multimeter (TR6840) manu- 180° C. for 15 minutes to obtain a flat plate in the form of double-side grooved fuel cell separator (see FIG. 2).

Effect of the Invention

The curable composition of the present invention can give a cured product having excellent physical properties (for example, heat resistance, hot water resistance, electrically conductivity and/or heat-dissipating property) and therefore, is widely applicable as a material in the region conventionally difficult to realize, for example, in various uses and components such as fuel cell separator, electrode, circuit board, resistor, heater, dust collecting filter element, current collector for battery, planar heating element and electromagnetic material, and particularly useful as a material for the separator of a fuel cell such as polymer electrolyte fuel cell.

The invention claimed is:

1. An electrically conducting curable resin composition comprising (A) a hydrocarbon compound having a plurality of carbon-carbon double bonds, (B) an elastomer excluding the component (A), and (C) a carbonaceous material, wherein the mass ratio of the hydrocarbon compound having a plurality of carbon-carbon double bonds as the component (A) and the elastomer as the component (B) is from 40 to 90% by weight: from 60 to 10% by weight, and the carbonaceous material (C) is one member selected from graphite, vapor grown carbon fiber, carbon nanotube, and a boron-containing carbonaceous material, or a combination of two or more members selected therefrom, wherein (B) is an elastomer selected from the group consisting of an ethylene octene copolymer and an ethylene butene copolymer.

2. The electrically conducting curable resin composition as defined in claim 1, wherein the hydrocarbon compound (A) having a plurality of carbon-carbon double bonds is a polymer having carbon-carbon double bonds in the side chain.

3. The electrically conducting curable resin composition as defined in claim 2, wherein the polymer having carbon-carbon double bonds is a polymer having carbon-carbon double bonds in the side chain and containing 60 mol % or more of a saturated monomer unit in the main chain.

4. The electrically conducting curable resin composition as defined in claim 3, wherein the polymer having carbon-carbon double bonds in the side chain and containing 60 mol % or more of a saturated monomer unit in the main chain is obtained by polymerizing a diene compound as the main monomer.

5. The electrically conducting curable resin composition as defined in claim 4, wherein the diene compound is at least one member selected from butadiene, pentadiene and isoprene.

6. The electrically conducting curable resin composition as defined in claim 1, wherein the hydrocarbon compound (A) having a plurality of carbon-carbon double bonds is at least one member selected from 1,2-polybutadiene, 3,4-polyisoprene and a styrene-isoprene copolymer.

7. The electrically conducting curable resin composition as defined in claim 1, wherein the hydrocarbon compound (A) having a plurality of carbon-carbon double bonds is a polymer comprising 60 mol % or more of a monomer unit represented by the following formula (1) or (2):

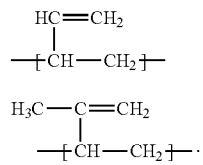

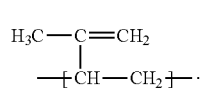

8. The electrically conducting curable resin composition as defined in claim 1, wherein the carbonaceous material (C) has a powder specific electrical resistance of 0.1 Ωcm or less in the direction at right angles to the applied pressure direction in the state of being pressurized to have a bulk density of 1 g/cm3.

9. The electrically conducting curable resin composition as defined in claim 1, wherein the carbonaceous material (C) comprises from 0.05 to 10% by weight of boron.

10. The electrically conducting curable resin composition as defined in claim 1, wherein assuming that the sum of the component (A) and the component (B) is 100 parts by weight, the carbonaceous material as the component (C) is contained at a proportion of 40 to 1,900 parts by weight per the sum of 100 parts by weight.

11. The electrically conducting curable resin composition as defined in claim 1, which further comprises (D) a reactive monomer.

12. An electrically conducting cured product obtained by curing the electrically conducting curable resin composition defined in claim 1.

13. An electrically conducting cured product obtained by forming the electrically conducting curable resin composition defined in claim 1 by any one method of compression molding, transfer molding, injection molding and injection-compression molding.

14. The electrically conducting cured product as defined in claim 12, wherein the volume resistivity according to JIS K7194 is 2×10-2 Ωcm or less.

15. The electrically conducting cured product as defined in claim 12, wherein the flexural strength according to JIS K6911 is 30 MPa or more.

16. A method for producing an electrically conducting cured product, the method comprising forming the electrically conducting curable composition defined in claim 1 by any one method of compression molding, transfer molding, injection molding and injection-compression molding.

17. An electrically conducting molded article comprising the electrically conducting curable resin composition defined in claim 1 or the electrically conducting cured product defined in claim 12.

* * * * *